United States Patent Office 2,976,337
Patented Mar. 21, 1961

2,976,337
CATALYTIC DEHYDROGENATION

Harold F. Christmann, Houston, Tex., assignor to Petro-Tex Chemical Corporation, Houston, Tex., a corporation of Delaware No Drawing. Filed Aug. 4, 1958, Ser. No. 753,148

3 Claims. (Cl. 260—680)

This invention relates to production of olefins by catalytic dehydrogenation and relates more particularly to improved catalytic compositions useful in the preparation of butadiene from butylenes and isoprene from isopentylene by catalytic dehydrogenation.

In the preparation of butadiene by dehydrogenation of butylenes in the presence of steam and at high temperatures, a particularly useful class of catalysts are the alkalized iron oxides. Such catalysts are described in United States Patents 2,408,140 and 2,414,585. These catalysts contain essentially iron oxide and a compound of potassium. Minor amounts of difficultly reducible metal oxides such as chromium oxide are disclosed in the above patents to be desirable additives as stabilizers in minor proportions. The patents also teach that the catalysts may contain minor amounts of fillers but that such materials as alumina are used, if at all, only in minor concentrations. In use, butylene and superheated steam are passed through a bed of the described catalyst at a temperature of about 600° C. Normally, about 10 to 15 moles of steam per mole of hydrocarbon to be dehydrogenated are employed. The butadiene-containing effluent is then treated to recover butadiene in accordance with well known procedures.

Butylenes normally supplied for dehydrogenation to butadiene are from two general sources, as refinery by-products, and as the product of butane dehydrogenation. Butadiene and butylenes are also prepared from n-butane by dehydrogenation and in such processes alumina-chromia catalysts have been widely employed. The catalyst in this system must be regenerated at frequent intervals. While these catalysts have been successfully used to dehydrogenate n-butane to butadiene and butenes, they are sensitive to steam and in the system described above for the alkalized iron oxide catalysts, these alumina-chromia catalysts have not been successfully used commercially in autoregenerative processes to dehydrogenate butylenes to butadiene in the presence of steam.

It has now been found, quite unexpectedly, that when a minor amount of finely divided iron oxide and a compound of potassium convertible to potassium carbonate are intimately mixed with a major proportion of a finely divided alumina-chromia catalyst, of the type normally employed in the dehydrogenation of n-butane to butadiene, even in a used or spent state, and the resulting mixture formed into pellets, the resulting catalyst composition readily dehydrogenates butylene to butadiene in the presence of steam at very satisfactory conversion-selectivity and life levels. This novel catalytic composition normally will contain from about 15 to about 40 weight percent iron oxide and a compound of potassium convertible to potassium carbonate under dehydrogenation conditions, and about 85 to about 60 weight percent alumina-chromia catalyst intimately mixed, as from powders thereof, and pelleted. On a weight basis, the separate ingredients in the catalytic compositions may be varied as follows: iron oxide, as essentially $Fe_2O_3$, from about 10 to about 20 weight percent; the potassium compound as potassium carbonate, from about one to about 20 weight percent; and the aluminum oxide may be as high as about 85 weight percent and chromium oxide or other difficultly reducible metal oxide may be substituted for up to about 50 weight percent of the aluminum oxide. For example, catalysts for effecting dehydrogenation of hydrocarbons in the presence of steam, may comprise more than about 50 weight parts of alumina, about 10 to about 20 weight parts of iron oxide, about one to about 20 weight parts of a potassium compound convertible to potassium carbonate under dehydrogenation conditions, and about 5 to about 20 weight parts of a difficutly reducible metal oxide. The potassium compound convertible to potassium carbonate under dehydrogenation conditions may preferably be present from about 10 to about 20 weight parts.

The utility of these catalysts is quite unexpected, in view of the clear teachings of the prior art. The art has accepted the condition that alkalized iron oxide catalysts should contain only minimum amounts, if any, of fillers, since the activity of the catalysts is considered to be a function of its concentration. When inert fillers, such as pumice, carborundum, attapulgus clay, magnesium silicate, diatomaceous earth and the like are employed in place of the alumina-chromia material of the catalysts, in the steam-diluted butylene dehydrogenation system, conversion and yield to butadiene are negligible as contrasted to conversions-selectivity value as high as about 120 with the novel catalytic composition of this invention. Further, the art clearly teaches the undesirability of employing alumina with alkalized iron oxide catalysts, even in small amounts.

The successful use of alumina-chromia materials in catalysts for autoregenerative dehydrogenation wherein steam is mixed with the olefin to be dehydrogenated is quite unexpected. Coking of the catalyst is not obtained contrary to experience in dehydrogenation with alumina-chromia catalysts where alternate cycles of dehydrogenation and regeneration by burning is required to remove carbon deposited on the catalyst during the dehydrogenation cycle. Further, the catalysts of this invention are more active at a given temperature than the alkalized iron oxide catalysts alone so that comparable selectivity and yield may be obtained at lower temperatures.

An even more unexpected consequence of the present invention is the discovery that used alumina-chromia catalysts from butane dehydrogenation reactors and spent alumina-molybdena catalysts from petroleum hydroforming reactors, or fresh alumina-chromia catalysts for butane dehydrogenation which have been calcined to the point that they have negligible activity as dehydrogenation agents, may be mixed with the iron oxide and potassium carbonate in amounts as high as about 80 weight percent, and a catalytic composition is obtained which is essentially equivalent in activity in dehydrogenating butylenes to butadiene in the presence of steam as fresh undiluted alkalized iron oxide. The favorable economics of such a catalyst are readily apparent.

When used alumina-chromia catalyst from a Houdry butane dehydrogenation reactor after an average six month residence therein is employed alone in a dehydrogenation reactor as described in the examples hereinafter, in the presence of steam and butylenes in a normal ratio of 13 steam 1 butylene, essentially no catalytic conversion of butylene to butadiene-1,3 is obtained. When catalyst pellets containing only 10 percent of 50/50 mixture of iron oxide as $Fe_2O_3$ containing 5 percent chromium oxide and potassium carbonate and 90 percent of the used alumina-chromia material are employed in the same system, the mole percent conversion of butylenes to butadiene-1,3 at 1215° F. is 16 and the mole percent selectivity is 71. When this catalyst is prepared to contain 20 percent of iron oxide, chromium oxide and potassium carbonate in the same proportions and 80 percent of the alumina-chromia component, at 1215° F. the mole percent conversion is about 35 and the mole percent selectivity is about 70.

One of the more successful catalysts for dehydrogenation of butylenes is an alkalized iron oxide catalyst containing potassium carbonate. Such catalysts are supplied in pellet form, which pellets are quite hygroscopic. As a consequence, extreme care must be taken in handling this material since on exposure to air the pellets rapidly absorb moisture with the result that the pellets glaze over, stick to one another, swell, become softer and are easily crushed. In contrast thereto, pellets of the catalyst of this invention may be exposed to air for long periods of time with no appreciable change in dimensions or hardness, no glazing or other deleterious effects from equivalent exposure to the moisture in air.

An obvious advantage is that no extra precaution in the plant are necessary with this catalyst as compared to the care that must be exercised with alkalized iron oxide containing potassium carbonate.

The essential ingredients of the catalyst are about 50 percent or more of alumina and lesser amounts of a difficultly reducible metal oxide such as chromium oxide and less than 50 percent iron oxide and an alkali metal compound. Mixtures of these essential ingredients prior to pelleting can, of course, be made by mixing the separate ingredients by any of the methods known to those skilled in the art. For example, the alumina may be treated with a salt of chromium and the resulting mixture heated to decompose the salt and deposit chromium oxide on the alumina. Powdered iron oxide and the alkali, such as potassium carbonate, may be added to the alumina-chromia component in the proportions and particle size set forth herein, the resulting mixture pelleted and dried, if necessary. Likewise, $Al_2O_3$, $Cr_2O_3$, $Fe_2O_3$ and $K_2CO_3$ can be mixed in powder form and pelleted. The catalysts of this invention also may be prepared by mixing the finely ground alkalized iron oxide component and finely ground alumina-chromia component together and pelleting the mixture.

The alumina may be any of the known forms of alumina, although preferably it is an activated alumina, so that a difficultly reducible metal oxide, if desired, is readily deposited thereon. Aluminum gels carrying the desired metal oxides may also be employed. The difficultly reducible metal oxides are employed in amounts no greater than, and preferably less than, the amount of alumina. Useful difficultly reducible metal oxide materials from groups IVb, Vb and VIb of the periodic table may be employed in conjunction with the alumina. Particularly useful are chromium oxide, molybdenum oxide, vanadium oxide, and the like.

The alumina-chromia butane dehydrogenation catalysts, generally, are prepared by treating activated alumina with a solution of chromic acid and after drying, heating the treated activated alumina at temperatures of about 600° C. The concentration of chromia or other difficultly reducible metal oxides on the alumina may be varied quite widely between about 6 percent and 40 percent as chromic oxide, but more generally is from about 15 percent to about 25 percent chromium oxide.

It is apparent that a major advantage of this invention is that the major component of the catalyst can be a material which is normally discarded after use; that is, spent alumina-chromia catalyst used for dehydrogenating butane, and spent reforming catalysts such as alumina-molybdenum oxide. Such alumina-chromia catalysts are normally discarded when the conversion and selectivity drop to such levels that it is uneconomical to continue their use. To these two normally waste products, in a finely divided state, are added the desired alkalized iron oxide, either as a finely divided material and pellets formed therefrom, or the separate ingredients thereof are mixed with the spent ground alumina-chromia or alumina-molybdenum oxide and the desired pellets formed therefrom.

The iron oxide and potassium carbonate components may be employed as alkalized iron oxide which may be prepared by mixing powdered iron oxide as $Fe_2O_3$ with a small amount of a difficultly reducible metal oxide, preferably chromium oxide $Cr_2O_3$ and a compound of an alkali or alkaline earth metal, normally potassium carbonate. The amount of iron oxide employed is normally varied from about 95 to about 40 weight parts and the amount of alkali metal compound employed is varied from about one to about 50 or more parts, with minor amounts of stabilizers which are normally difficultly reducible metal oxides, such as chromium oxide and the like. Cobalt oxide may be substituted, in part, for the iron oxide and likewise chromium oxide may be substituted in part for the iron oxide. In the normal preparation of the alkalized iron oxide component, the essential ingredients are first mixed together, either dried as the oxides, or as solutions of salts which are co-precipitated and the resulting mixtures calcined at about 900° C., or the iron oxide may be calcined first and then mixed with the other ingredients as stated, in the practice of this invention. The alkali metal compound is preferably a potassium compound as described but may include other alkali or alkaline earth metal compounds convertible to the carbonate under conditions of use. Potassium carbonate is preferred. Potassium oxide, of course, is converted to potassium carbonate under dehydrogenating conditions. The alkalized iron oxide in finely divided form, or the ingredients thereof, may be mixed with the appropriate alumina material and the mixture formed into pellets. Better results are ordinarily obtained when the separate ingredients, such as iron oxide, chromium oxide if desired, and potassium carbonate are added to the alumina-chromia component as separate ingredients and the mixture pelleted. The ratio of iron oxide to potassium carbonate or a compound of potassium convertible to potassium carbonate under reaction conditions, and based on iron oxide or $Fe_2O_3$, is preferably about 100 $Fe_2O_3$ to about 5 to 150 $K_2CO_3$. On the total catalyst composition, the weight parts of iron oxide as $Fe_2O_3$ preferably will vary from about 10 to about 20 weight parts, the compound of potassium calculated as potassium carbonate from about 5 to about 30 weight parts and the alumina-chromia component greater than about 60 weight parts of which said chromia is present in amount from about 10 to 30 percent.

In the preparation of the catalytic compositions of this invention, a variety of procedures may be employed. For example, powdered alkalized iron oxide may be employed as such. Such a material may be prepared by calcining ferric oxide or an iron derivative convertible to ferric oxide as at about 800° C. for about thirty minutes. The resulting iron oxide is finely ground and mixed with potassium carbonate. This mixture may be formed into a paste with water and the resulting paste formed into pellets and dried. In using such materials to make the catalytic compositions of this invention, the pellet form of the alkalized iron oxide is neither desired nor required and the pellets, if provided as such, are reground to sizes defined hereinafter. Of course the necessary separate ingredients may be employed as such, or in any combination thereof and the mixture prior to paste forming as above, or the paste itself, admixed with finely ground alumina-chromia, which mixture is then formed into pellets. Precipitation of a compound of iron convertible to $Fe_2O_3$ in the presence of the alumina-chromia component and, or added thereafter, potassium carbonate or a compound of potassium convertible to potassium carbonate under dehydrogenation conditions, with subsequent drying, calcining, grinding if necessary and pelleting results in a useful catalyst. The pellets may be formed by dry tabletting, formed into a paste and extruded as pellets, and the like.

A useful alumina-chromia material is prepared by treating activated alumina with a solution of chromic acid, draining the alumina, drying and heat treating at about 1400° F. The commercial alumina-chromia material normally used for butane dehydrogenation contains about 20% chromium oxide. Examples of the preparation of suhc catalyst materials will be found in United States Patents 2,399,678 and 2,419,997. Also useful are mixtures of $Al_2O_3$ and $Cr_2O_3$ powders.

The alumina-molydenum oxide hydroforming component is readily obtained by mixing $MoO_3$ with alumina and pelleting, or by depositing from solution a salt of molybdenum such as ammonium molybdate decomposible to the oxide and the like, on the alumina. 10 percent $MoO_3$ to 90 percent alumina is the usual concentration, but this may be varied from about 5 to about 20 percent.

Since an intimate mixture of the essential components of the novel catalysts of this invention in pellet form is required, the catalysts are either prepared with each essential component ground to the desired particle size, or in the case of alkalized iron oxide or alumina-chromia components as such, these materials should be within a preferred particle size range. Preferably, the essential ingredients of the catalysts are ground to a particle size so that they will pass a 10-mesh screen; that is be particles less than about 1/10 inch in size and more preferably, the average particle size will be smaller than about 1/100 inch in diameter; that is, about 90 percent will readily pass a 100-mesh screen. Although useful catalysts are made from ingredients having particle sizes as small as 1/1000 inch, it is recognized that the obtainment of fineness of this degree of some of the essential ingredients of this catalyst may be difficult and costly, so that normally, the necessary ingredients will have particle sizes in the range of about 1/10 inch to 1/100 inch, although smaller particle size materials may be employed for each or any one of the separate or combined necessary ingredients.

The particle size and shape of the pellets themselves may be varied, but it is well understood by those skilled in the art that pellets of too small a particle size cause undesirable pressure drops in fixed bed operations, and, ordinarily, poor results are obtained at equivalent flow rates with large pellets. A useful range of pellet particle sizes is from about 1/32 to about 1/2 inch, more preferably about 1/8 to about 3/16 inch, of a cylindrical shape, in which, normally, the diameter and height of the pellet range from the same size to those wherein the pellets are about three to five times in length the diameter of the pellet.

A commercially useful catalytic composition is readily prepared from used alumina-chromia catalyst from a Houdry dehydrogenation reactor by separating the Alundum from the alumina-chromia pellets and grinding the alumina-chromia pellets to 90 percent less than 0.0058 inch (through 100 mesh U.S. screen) diameter particle size by milling. 72 parts of the milled spent alumina-chromia catalyst is dry mixed with 17.6 parts of pigment grade red iron oxide, $Fe_2O_3$, 9.8 parts of anhydrous potassium carbonate and 0.6 part of chromium oxide, $Cr_2O_3$. Water is added in amount sufficient to produce a paste which can be extruded. The paste is extruded in pellet form and extrudates are dried in an oven 215 to 300° F. The finished composition contains, on a 1000° F. dry basis, 55 to 57 weight percent $Al_2O_3$, 14 to 15 weight percent $Cr_2O_3$, 17 to 18 weight percent $Fe_2O_3$, and 9 to 10 weight percent $K_2CO_3$. The pelletized catalysts are 3/16 inch diameter, 5/32–7/32 inch in length, have an average crush strength in pounds of greater than 12 to 15, an apparent bulk density of 1.2–1.4 grams per cubic centimeter and a surface area of about 15 square meters per gram.

The process of the invention using the novel catalyst as described is carried out under autoregenerative conditions, i.e. at temperatures above about 580° C. and generally below about 700° C. in the presence of a molar excess of steam, i.e. 2 to 15 moles of steam per mole of olefin, under which conditions the dehydrogenation may be carried out substantially continuously over long periods of time. The reaction may be carried out at any desired pressure in any desired type of reaction system, and in fixed or fluid beds, and is of general application where autoregenerative dehydrogenation, as pointed out above, is employed in the dehydrogenation of olefins and alkylaromatic hydrocarbons in general and particularly n-butylene to butadiene, isopentylenes to isoprene, the dehydrogenation of ethyl benzene to styrene, and the like.

In the following examples, relatively standard testing conditions are employed and an olefin and steam are passed through a catalyst bed at selected temperatures and at a standard space velocity and steam/olefin molar ratio. The gaseous space velocity was held at 350 volumes per hour per unit volume of catalyst. The steam/olefin ratio was maintained at 13 moles of steam/mole of olefin. The olefin employed in Examples 1 through 11 contained about 98% butylene-2. The water used to form the steam the steam is redistilled plant steam condensate. The catalyst in each case was given a two-hour pretreatment in a stream of steam and hydrogen in which the hydrogen flow rate is adjusted so that the effluent gas contains 2/10 mole fraction of hydrogen. During this pretreatment, the steam rate is set so that it will give a molar ratio of 13 to 1 of steam to olefin when the olefin feed is started. At the end of the two-hour pretreatment, the hydrogen flow is shut off and olefin is introduced. After flow conditions have been established, samples for analysis were taken at periodic intervals. Conversion is defined as the moles of olefin consumed per 100 moles of olefin fed to the reactor. Selectivity is defined as moles of diolefin formed per 100 moles of olefin consumed. Yield is the product of conversion and selectivity. Ordinarily, at a given yield, say 25 mole percent, the highest selectivity obtainable is desired. A valuable bench mark is the total number value of conversion plus selectivity since this figure is relatively independent of temperature variation in the reactor.

*Example 1*

A standard alumina-chromia butane dehydrogenation catalyst in tablet form about 3/16 inch in size, having a surface area of 52 square meters per gram was removed from a Houdry dehydrogenation reactor after six months' service in dehydrogenating butane, the Alundum grains separated therefrom and 50 pounds of this material was ground to pass a 35 mesh screen. This alumina-chromia material contained 20 percent chromium oxide. 13 pounds of ferric oxide, 12 pounds of anhydrous potassium carbonate and one-half pound of chromium oxide, ground to pass a 35 mesh screen, were mixed with the alumina-chromia component. About 8 percent water was added to this mixture and pellets of catalyst were extruded which were about 1/8 inch in size. The pellets were dried in an oven at less than 300° F. This catalyst contained about 18 percent $Fe_2O_3$, 13 percent $Cr_2O_3$, 15 percent $K_2CO_3$ and 54 percent $Al_2O_3$. These pellets had a crush strength of about 25 pounds and were dimensionally stable upon exposure to air. This catalyst was evaluated under standard test conditions as described above at the following temperatures and the results obtained in terms of butadiene-1,3 were:

| Temp., °F. | Mole Percent Conversion | Mole Percent Selectivity | Mole Percent Yield |
|---|---|---|---|
| 1,175 | 23 | 84 | 20 |
| 1,215 | 35 | 77 | 27 |
| 1,250 | 48 | 71 | 34 |

The C-S values of 107 to 119 on this catalyst are exceptionally good.

Example 2

Another catalyst prepared essentially as described in Example 1 is provided from 275 pounds of used alumina-chromia butane dehydrogenation catalyst, 90 pounds of ferric oxide, 100 pounds of anhydrous potassium carbonate and 5 pounds of chromium oxide. The resulting pellets contained about 18 percent $Fe_2O_3$, 20 percent $K_2CO_3$, 12 percent $Cr_2O_3$ and 50 percent $Al_2O_3$. Evaluation of this catlyst yielded the following data:

| Temp., °F. | Mole Percent Conversion | Mole Percent Selectivity | Mole Percent Yield |
|---|---|---|---|
| 1,175 | 32 | 74 | 24 |
| 1,215 | 42 | 68 | 29 |
| 1,250 | 53 | 61 | 32 |

When this example is repeated with the used alumina-chromia catalyst alone, without the added iron oxide and potassium carbonate, essentially no catalytic conversion of butylenes to butadiene-1,3 is obtained.

Example 3

150 grams of spent butane dehydrogenation alumina-chromia catalyst from a Houdry butane dehydrogenation reactor, containing 20% chromia, was ground to pass through a 45 mesh screen and was mixed with 38 grams of iron oxide which had been calcined for thirty minutes at 850° C. and passed a 45 mesh screen, and 20 grams of powdered anhydrous potassium carbonate. The mixed powders were pressed into tablets 5/32 inch in height and width which had an apparent bulk density of 1.2 grams per cubic centimeter. This catalyst contained 18 percent $Fe_2O_3$, 10 percent $K_2CO_3$, 14 percent $Cr_2O_3$ and 58 percent $Al_2O_3$. Results obtained on testing this catalyst were as follows:

| Temp., °F. | Mole Percent Conversion | Mole Percent Selectivity | Mole Percent Yield |
|---|---|---|---|
| 1,175 | 27 | 77 | 21 |
| 1,215 | 36 | 69 | 25 |
| 1,255 | 50 | 58 | 29 |

Example 4

A standard alumina-chromia butane dehydrogenation catalyst in tablet form about 3/16 inch in diameter and length, having a bulk density in grams per ml. of 1.1 and having a surface area of 52 square meters per gram was finely ground and calcined for 20 hours at 1100° C. This alumina-chromia catalyst was initially prepared by treating activated alumina with chromic acid and calcining so as to contain about 20% $Cr_2O_3$. 150 grams of this ground calcined material was mixed with 58 grams of an alkalized iron oxide component which was also ground so that both materials passed through a 40 mesh screen. The alkalized iron oxide component was prepared from calcined ferric oxide and contained 61 parts of the iron oxide with 3 parts of chromic oxide and 36 parts of potassium carbonate powders. The mixed powders were dry tabletted into 1/8 inch x 1/8 inch cylindrical tablets. The apparent bulk density of the tablets was about 1.1 grams per cubic centimeter and the surface area was over 10 square meters per gram. The composition of the catalyst was, by weight, 15 percent $Fe_2O_3$, 8.5 percent $K_2CO_3$, 15 percent $Cr_2O_3$ and 61.5 percent $Al_2O_3$. This catalyst was evaluated under standard test conditions at the following indicated temperatures for periods of several hours. The results obtained in terms of butadiene-1,3 were:

| Temp., °F. | Mole Percent Conversion | Mole Percent Selectivity | Mole Percent Yield |
|---|---|---|---|
| 1,175 | 26 | 81 | 21 |
| 1,200 | 31 | 77 | 24 |
| 1,225 | 37 | 74 | 27 |
| 1,250 | 42 | 71 | 30 |

The C-S number values of 107 to 113 are exceptionally good.

After 1800 hours life test at 1200° F. the activity of this catalyst remained essentially constant. For example, at 100 hours the conversion was 28 percent and selectivity 76 percent, at 350 hours conversion was 35 percent and selectivity 75 percent, at 400 hours conversion was 38 percent and selectivity 75 percent.

Example 5

A catalyst composition is prepared following the procedure of Example 4 with the exception that the alumina-chromia component is used catalyst obtained from Houdry butane dehydrogenation reactors after six months' use, and the amount employed was 80 percent of this component with 20% of the alkalized iron oxide material of Example 4. Both components were ground to pass a 40 mesh screen and were dry tabletted. The composition of this catalyst was 12.5 percent $Fe_2O_3$, 6.4 percent $K_2CO_3$, 16.5 percent $Cr_2O_3$ and 63.1 percent $Al_2O_3$. Results obtained on this catalyst were:

| Temp., °F. | Mole Percent Conversion | Mole Percent Selectivity | Mole Percent Yield |
|---|---|---|---|
| 1,175 | 23 | 79 | 18 |
| 1,215 | 35 | 69 | 24 |
| 1,255 | 48 | 59 | 28 |

This example was repeated with only 10 percent of the alkalized iron oxide component and the weight percent composition of the catalyst was 6.2 $Fe_2O_3$, 3.2 $K_2CO_3$, 8.2 $Cr_2O_3$ and 82.4 $Al_2O_3$. The test results obtained were as follows:

| Temp., °F. | Mole Percent Conversion | Mole Percent Selectivity | Mole Percent Yield |
|---|---|---|---|
| 1,175 | 10 | 77 | 8 |
| 1,215 | 16 | 71 | 11 |
| 1,255 | 22 | 64 | 14 |

To obtain the necessary commercially practicable selectivity and conversion the catalyst should contain more than 10 percent of the alkalized iron oxide component or the separate ingredients thereof.

Example 6

The catalytic composition of Example 4 is reproduced by the same procedure and ratios of ingredients with the exception that the alumina-chromia component was freshly prepared and not calcined but was used as prepared after grinding the as-received pellets. The tabletted catalysts were 5/32 inch in diameter and length, had a surface area of 48 square meters per gram, and the apparent bulk density of the tablets was 1.2 grams per cubic centimeter. The following test data was obtained on this catalyst:

| Temp., °F. | Mole Percent Conversion | Mole Percent Selectivity | Mole Percent Yield |
|---|---|---|---|
| 1,175 | 23 | 72 | 17 |
| 1,215 | 34 | 70 | 24 |
| 1,255 | 44 | 68 | 30 |

Example 7

A catalytic composition was prepared exactly as described in Example 4, with the exception that the calcined alumina-chromia composition was replaced with an alumina-chromia catalyst containing about 20% chromia which is identified as "used" butane dehydrogenation catalyst which was taken from a Houdry dehydrogenation reactor after more than six months use therein; the Alundum was separated therefrom and the spent catalyst pellets were ground so as to pass through a 40 mesh screen. The mixed powder was compressed into 5/32 inch length and width tablets having an apparent bulk density of 1.3 grams per cubic centimeter. The surface area was 15 square meters per gram. The following results were obtained on tests of this catalyst:

| Temp., °F. | Mole Percent Conversion | Mole Percent Selectivity | Mole Percent Yield |
|---|---|---|---|
| 1,175 | 32 | 73 | 23 |
| 1,215 | 44 | 65 | 28 |
| 1,255 | 57 | 53 | 30 |

Example 8

A pelletized catalyst was prepared following the procedure of Example 7. All of the ingredients in this example were ground to pass a 200 mesh screen. The results of tests on this catalyst were as follows:

| Temp., °F. | Mole Percent Conversion | Mole Percent Selectivity | Mole Percent Yield |
|---|---|---|---|
| 1,175 | 33 | 72 | 24 |
| 1,215 | 45 | 62 | 28 |
| 1,255 | 56 | 52 | 29 |

Example 9

A pelletized catalyst was prepared by mixing 38 parts of iron oxide which had been calcined for thirty minutes at 850° C. with 20 parts of anhydrous potassium carbonate and 100 parts of used alumina-chromia butane dehydrogenation catalyst, all ground to pass a 45 mesh screen. The mixed powders were compressed into tablets 5/32 inch in size which had an apparent bulk density of 1.2 grams per cubic centimeter. This catalyst contained 18 percent $Fe_2O_3$, 10 percent $K_2CO_3$, 14 percent $Cr_2O_3$, and 58 percent $Al_2O_3$. Results obtained on this test were as follows:

| Temp., °F. | Mole Percent Conversion | Mole Percent Selectivity | Mole Percent Yield |
|---|---|---|---|
| 1,175 | 27 | 77 | 21 |
| 1,215 | 36 | 69 | 25 |
| 1,250 | 50 | 58 | 29 |

Example 10

A pelletized alkalized iron oxide catalyst prepared as described in Example 4, was ground to pass a 40 mesh screen. 150 grams of aluminum hydroxide powder was mixed with 58 grams of the ground alkalized iron oxide and the mixed powders were tabletted into tablets 5/32 inch in height and width. The apparent bulk density of the tablets was 0.84 gram per cubic centimeter and the surface area was 120 square meters per gram. This catalytic composition contained by weight 15 percent $Fe_2O_3$, 8.5 percent $K_2CO_3$, 0.5 percent $Cr_2O_3$, and 76 percent $Al_2O_3$. At 1175° F., the mole percent conversion was 35, the mole percent selectivity was 68, and the mole percent yield was 24. The aluminum hydroxide is converted to alumina under the influence of heat in the reactor.

A similar catalyst made with aluminum hydroxide which was calcined for 16 hours at 1100° C. to $Al_2O_3$ prior to mixing, was prepared. The results obtained at 1175° F. were mole percent conversion 34, mole percent selectivity 69 and mole percent yield 24.

Example 11

A catalytic composition was prepared in the proportions and by the procedure of Example 4, with the exception that attapulgus clay was substituted for the alumina-chromia material. 58 grams of the ground alkalized iron oxide component which passed a 40 mesh screen was mixed with 150 grams of attapulgus clay which passed a 45 mesh screen. The dry powder mixture was compressed into 5/32 inch tablets having a bulk density of 0.77 gram per cubic centimeter. At a temperature of 1215° F. the mole percent conversion was 7 and the mole percent yield was 4. When a similar catalytic composition was prepared with magnesium silicate in place of attapulgus clay, at the same temperature, the mole percent conversion was 2 and the mole percent yield was 1. When the concentration of alkalized iron oxide was raised to about 60 weight percent of the total catalyst composition, and the remainder was magnesium silicate, at 1215° F. the mole percent conversion was 3, the mole percent yield was 2. When the above examples were repeated with 30 to 60 mesh pumice, the mole percent conversion was 5.5 and the mole percent yield was 4. When diatomaceous earth was substituted for pumice, similar poor results were obtained, 5.5 mole percent conversion and 3.8 mole percent yield. When Carborundum was substituted for pumice, 6 mole percent conversion and 4 mole percent yield were obtained at 1215° F.

When the above examples are repeated with other mono-olefins containing 4 to 7 carbon atoms, similar excellent conversion to diolefins are obtained. Particularly efficient is the conversion of isopentylenes to isoprene.

Example 12

Example 7 was repeated with isopentylenes in place of butylenes. The feed contained 11 mole percent 2-methyl butene-1 and 88.5 mole percent 2-methyl butene-2. Isoprene was obtained in a 29 mole percent yield at good conversion and selectivity levels at 1175° F. When the example is repeated with (1) ethylbenzene and (2) isopropylbenzene in place of the isopentylene mixture, good yields of (1) styrene and (2) methylstyrene were obtained at satisfactory conversion and selectivity levels.

It will be apparent to the man skilled in the art that while the above examples were conducted under relatively standard conditions, that considerable variation in operating conditions can be made and excellent results obtained. For example, space velocity may be varied between about 200 to 500 or more volumes per hour per unit volume of catalyst. Likewise the steam/olefin ratio may be varied from about 10 to about 20 or more moles of steam per mole of olefin. In the case of both butylenes and isopentylenes, the feed stock composition may be varied quite widely and although butene-2 and 2-methyl butene-2 were employed in the examples, butene-1 2-methyl butene-1 and 3-methyl butene-1, or mixtures thereof with butene-2 and 2-methyl butene-2 respectively, as well as other olefins if desired, may be employed. Similarly, feed streams containing lower concentrations of the mono-olefins to be dehydrogenated may be employed. Many commercial operations use feed stocks containing from 60 to 85 percent of the mono-olefins to be dehydrogenated.

The pretreatment of the catalyst, although desirable, is not believed to be essential to obtain the desired results. Other catalysts of the type described herein may also be prepared and used in accordance with this invention in addition to those specifically set forth in the examples. As is apparent from the examples, excellent results were obtained with catalyst pellets which had surface areas greater than 10 square meters per gram and apparent bulk densities greater than about 0.5. Although the examples show fixed beds, the catalysts may be employed in fluidized beds. Of course, much smaller average particle size catalyst will be used, as from about 10 to about 150 microns. The separate ingredients or any desirable mixture or combination thereof may be ground to the required size, and adequate mixing obtained in the reactor by means of a suitable fluidizing gas such as hydrogen.

I claim:

1. A process for the dehydrogenation of mono-olefins of from 4 to 5 carbon atoms which comprises contacting said mono-olefins mixed with from 2 to 15 moles of steam per mole of mono-olefin at a temperature of about 580° C. to about 700° C. with a catalyst which comprises an intimate mixture of about 10 to about 20 weight parts iron oxide, about 5 to 30 weight parts of a potassium compound selected from the group consisting of potassium compounds convertible to potassium carbonate under dehydrogenation conditions and potassium carbonate, about 60 to 85 weight parts of a mixture of alumina and chromia, said chromia being about 5 to 20 weight parts of the final catalyst and wherein said alumina is 50 percent or more of the total catalyst, said catalyst having been prepared by mixing the iron oxide and potassium compound with the mixture of alumina and chromia, the mixture of alumina and chromia having been previously used as a dehydrogenation catalyst in a Houdry dehydrogenation reactor and having been ground to an average particle size of smaller than about 1/100 inch in diameter prior to mixing with the iron oxide and potassium compound.

2. A process for the dehydrogenation of butenes to butadiene which comprises contacting said butene mixed with from 2 to 15 moles of steam per mole of butene at a temperature of about 580° C. to about 700° C. with a catalyst which comprises an intimate mixture of about 10 to about 20 weight parts iron oxide, about 5 to 30 weight parts of a potassium compound selected from the group consisting of potassium compounds convertible to potassium carbonate under dehydrogenation conditions and potassium carbonate, about 60 to 85 weight parts of a mixture of alumina and chromia, said chromia being about 5 to 20 weight parts of the final catalyst, and wherein said alumina is 50 percent or more of the total catalyst, said catalyst having been prepared by mixing the iron oxide and potassium compound with the mixture of alumina and chromia, the mixture of alumina and chromia having been previously used as a dehydrogenation catalyst in a Houdry dehydrogenation reactor and having been finely ground prior to mixing with the iron oxide and potassium compound.

3. A process for the dehydrogenation of butenes to butadiene which comprises contacting butene mixed with from 2 to 15 moles of steam per mole of butene at a temperature of about 580° C. to about 700° C. with a catalyst which comprises an intimate mixture of about 10 to about 20 weight parts iron oxide, about 5 to 30 weight parts of a potassium compound selected from the group consisting of potassium compounds convertible to potassium carbonate under dehydrogenation conditions and potassium carbonate, about 60 to 85 weight parts of a mixture of about 80 weight percent alumina and about 20 weight percent chromia, said chromia being about 5 to 20 weight parts of the final catalyst, and wherein said alumina is 50 percent or more of the total catalyst, said catalyst having been prepared by mixing the iron oxide and potassium compound with the mixture of alumina and chromia, the mixture of alumina and chromia having been previously used as a dehydrogenation catalyst in a Houdry dehydrogenation reactor and having been ground to an average particle size of smaller than about 1/100 inch in diameter prior to mixing with the iron oxide and potassium compound.

References Cited in the file of this patent

UNITED STATES PATENTS

| | | |
|---|---|---|
| 2,172,534 | Grosse | Sept. 12, 1939 |
| 2,315,107 | Chickenoff et al. | Mar. 30, 1943 |
| 2,401,246 | Hull | May 28, 1946 |
| 2,408,140 | Gutzeit | Sept. 24, 1946 |
| 2,414,585 | Eggertsen et al. | Jan. 21, 1947 |
| 2,449,295 | Gutzeit | Sept. 14, 1948 |
| 2,461,147 | Davies et al. | Feb. 8, 1949 |
| 2,729,664 | Kirshenbaum | Jan. 3, 1956 |
| 2,804,487 | Donkle | Aug. 27, 1957 |
| 2,817,626 | Marby et al. | Dec. 24, 1957 |